Figure 1:
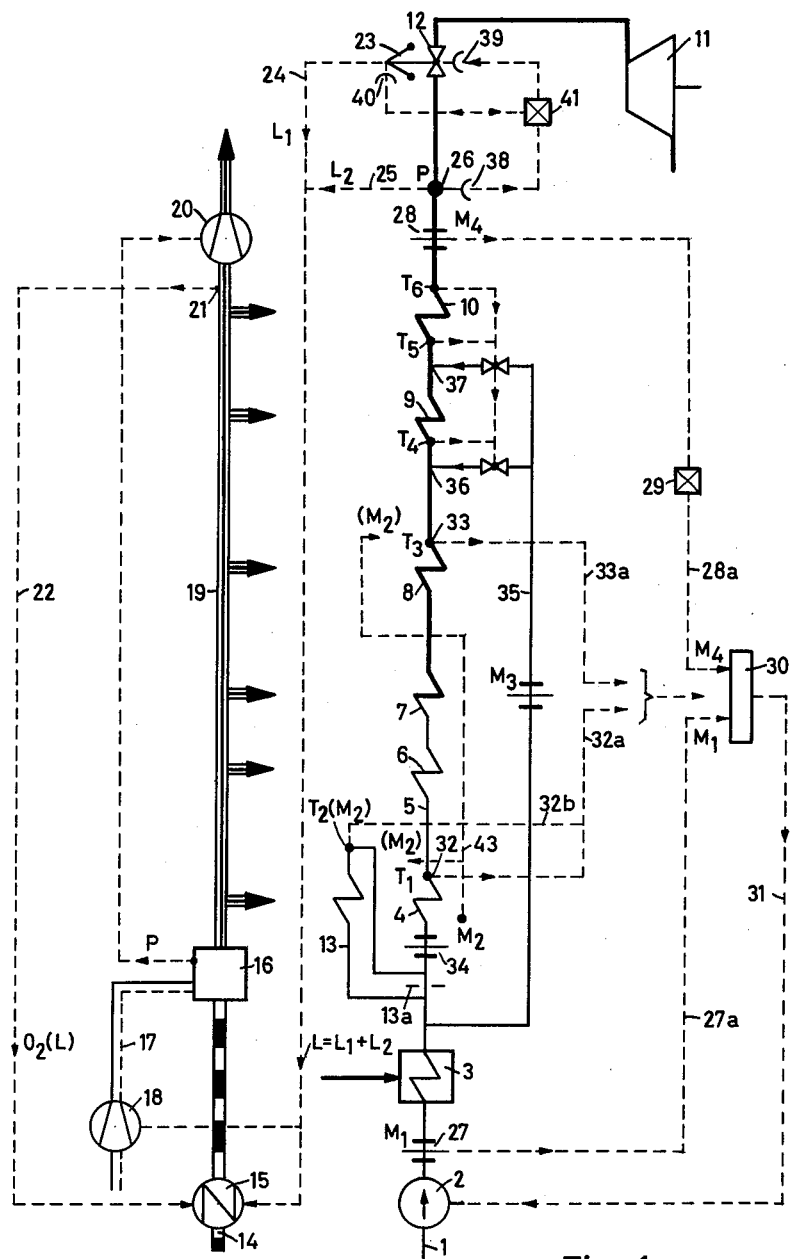

May 26, 1964            K. HALLE            3,134,367

REGULATING SYSTEM FOR ONCE-THROUGH BOILERS

Filed July 29, 1958            9 Sheets-Sheet 7

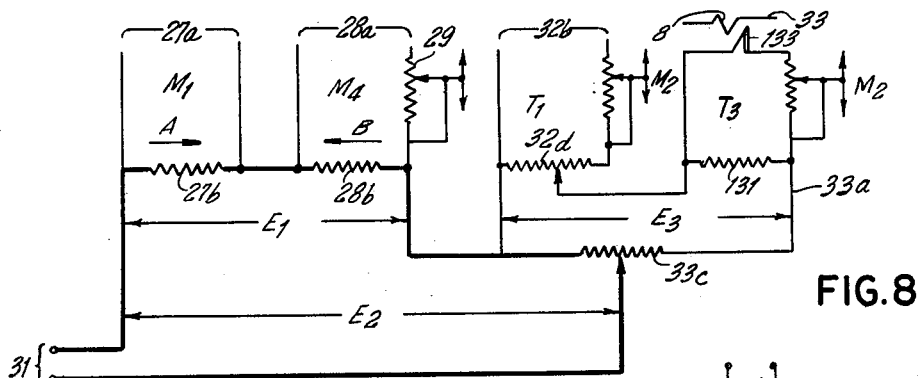
FIG. 8
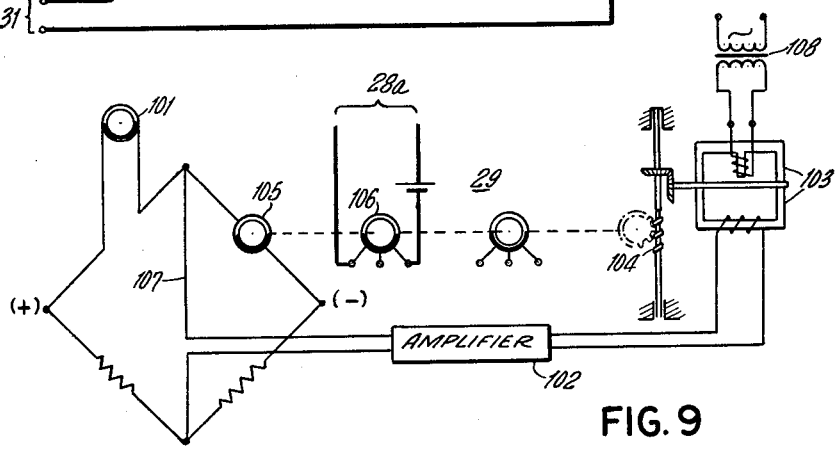
FIG. 9
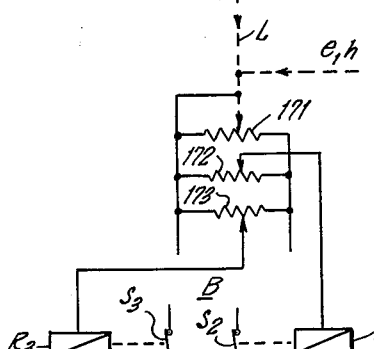
FIG. 11
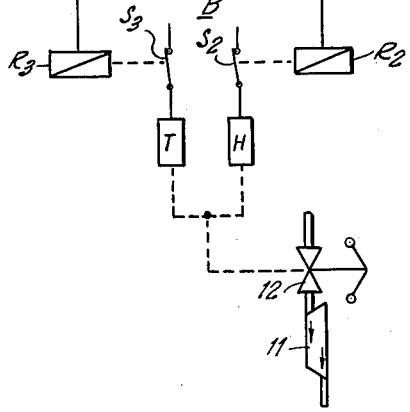

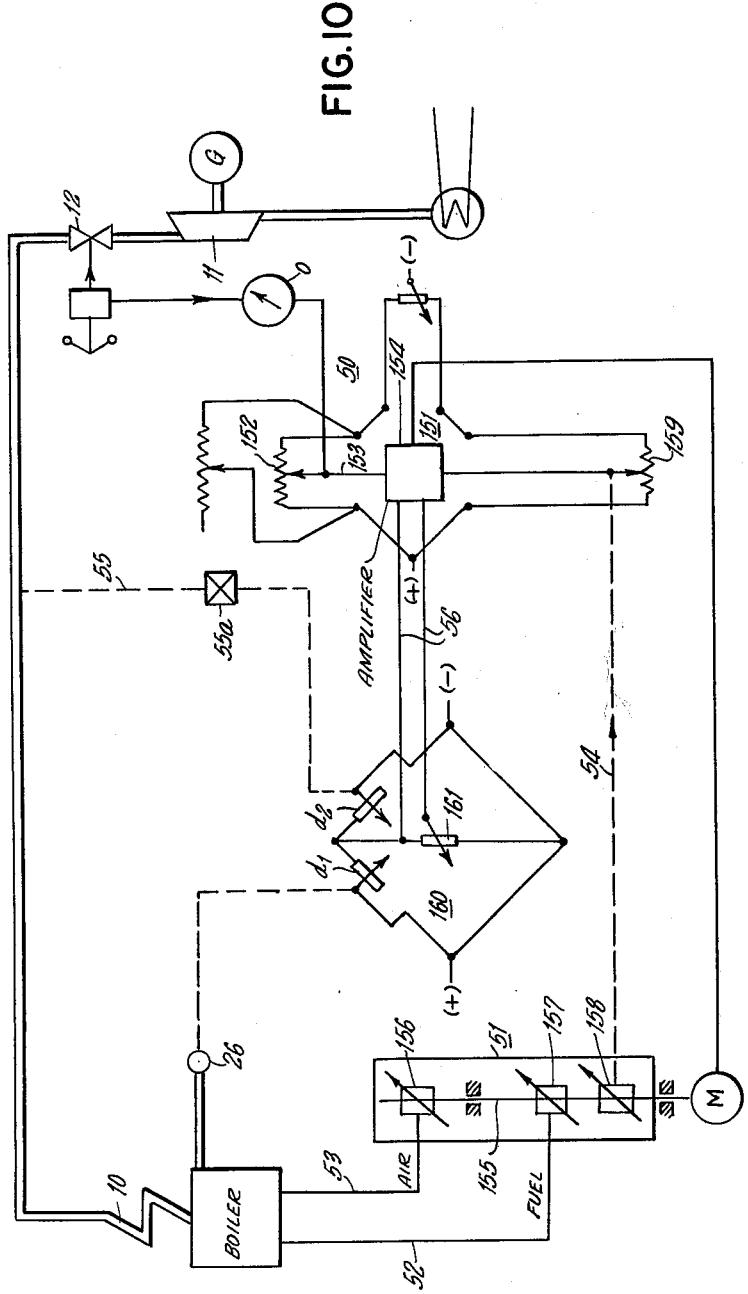

United States Patent Office 3,134,367
Patented May 26, 1964

3,134,367
REGULATING SYSTEM FOR ONCE-THROUGH
BOILERS
Kurt Halle, Erlangen, Germany, assignor to Siemens-Schuckertwerke Aktiengesellschaft, Berlin-Siemensstadt, Germany, a corporation of Germany
Filed July 29, 1958, Ser. No. 751,751
Claims priority, application Germany July 31, 1957
6 Claims. (Cl. 122—448)

My invention relates to the regulation of power plants equipped with forced-flow steam generators of the "once-through" or "series" type in which the feed water is heated, evaporated and superheated in a single passage through the tube system of a drumless boiler.

For satisfactory operation of such a plant it is necessary to provide regulating means which maintain the output of the steam generator in accordance with the power demand of the prime mover, usually in a steam turbine, operated by the generated steam, or vice versa. For this purpose, it is known to subordinate the boiler regulation to the turbine regulator so that the latter controls not only the performance of the turbine but, also that of the steam generator. It is also known to issue load-regulating signals simultaneously and in parallel to the turbine regulator and to the boiler regulator, a control by electrical signals or manual control or control by programming apparatus being applicable for such purposes.

In the known regulating systems of the above-mentioned and similar types, the boiler regulating means, comprising devices for control of the heat producing combustion and devices for controlling the forced flow of the working medium, are so grouped together that their operation for all magnitudes to be regulated is subject to the action of a boiler-load responsive master transmitter cooperating with a boiler-load regulator. The master transmitter issues the respective control signals for regulation of the feed-water supply, the coal or other fuel supply, and the supply of combustion air.

My invention is predicated upon the recognition that such domination of all individual regulating operations by a master transmitter is the cause of numerous regulatory difficulties and sources of trouble, because the coaction of regulating operations affecting the working medium on the one hand and the firing system on the other hand, requires different corrective control influences due to the fact that the respective controlling and regulating actions have greatly different effects upon the ultimate result desired of the regulating performance as a whole.

It is an object of my invention to minimize or eliminate such difficulties.

To this end, and in accordance with a feature of my invention, I provide for separate regulation of the heating system, for example of the fuel and the air, on the one hand, and of the working medium on the other hand, the regulation of the heating system being dependent primarily upon a given operating condition of the prime mover or other steam consumer at the boiler exit; and I further provide means acting upon the supply of the working medium to be evaporated for regulating it in accordance with the steam quantity required by the desired load conditions.

According to one of the more specific features of the invention the regulation of the quantities of working medium may be effected with the aid of a comparing device which is supplied by measuring values corresponding to the quantities to be evaporated on the one hand, and with measuring values that are derivatives of the quantities to be evaporated on the other hand, so that the quantity regulation depends upon the result of the comparison of the respective measuring values.

In drum-type boilers and other steam generators in which a water level occurs, the supply of feed water can be controlled in dependence upon changes in water level so that the boiler is regulated essentially toward maintenance of a constant level. It is further known to provide drum-type boilers with quantity-measuring diaphragms in the water-containing portion and in the steam-containing portion of the boiler for the purpose of comparing the respective measuring values and controlling the feed-water supply so as to keep the supplied quantity of feed-water essentially in accordance with the quantity of steam passing to the turbine. In the latter case, a signal derived from the change in height of the water level is utilized for correcting purposes.

Although a once-through boiler may be provided with measuring diaphragms or other pressure gauges, this type of boiler, due to the absence of a water level, does not afford using such level-responsive regulation for controlling the feed-water supply. However, according to another feature of my invention, the signals for imposing a corrective effect upon the feed-water regulation are provided by means of temperature gauges acting at two points of the boiler tube system, one point being located in the water-containing portion and the other in a steam-containing portion of the system. The sensed values of temperature are not directly applied for the desired corrective purpose which is rather effected indirectly by means of magnitudes derived from the measured temperature values in dependence upon the flow quantity of the working medium. For measuring the flow quantities conventional measuring diaphragms or the like quantity gauges may be used; however, according to another feature of my invention, the pressure of the medium may be sensed at two measuring locations ahead and at the rear of a given boiler portion, for example, a super-heater, and the pressure drop in this boiler portion may be used as a measure of the flow quantity.

Figure 4:
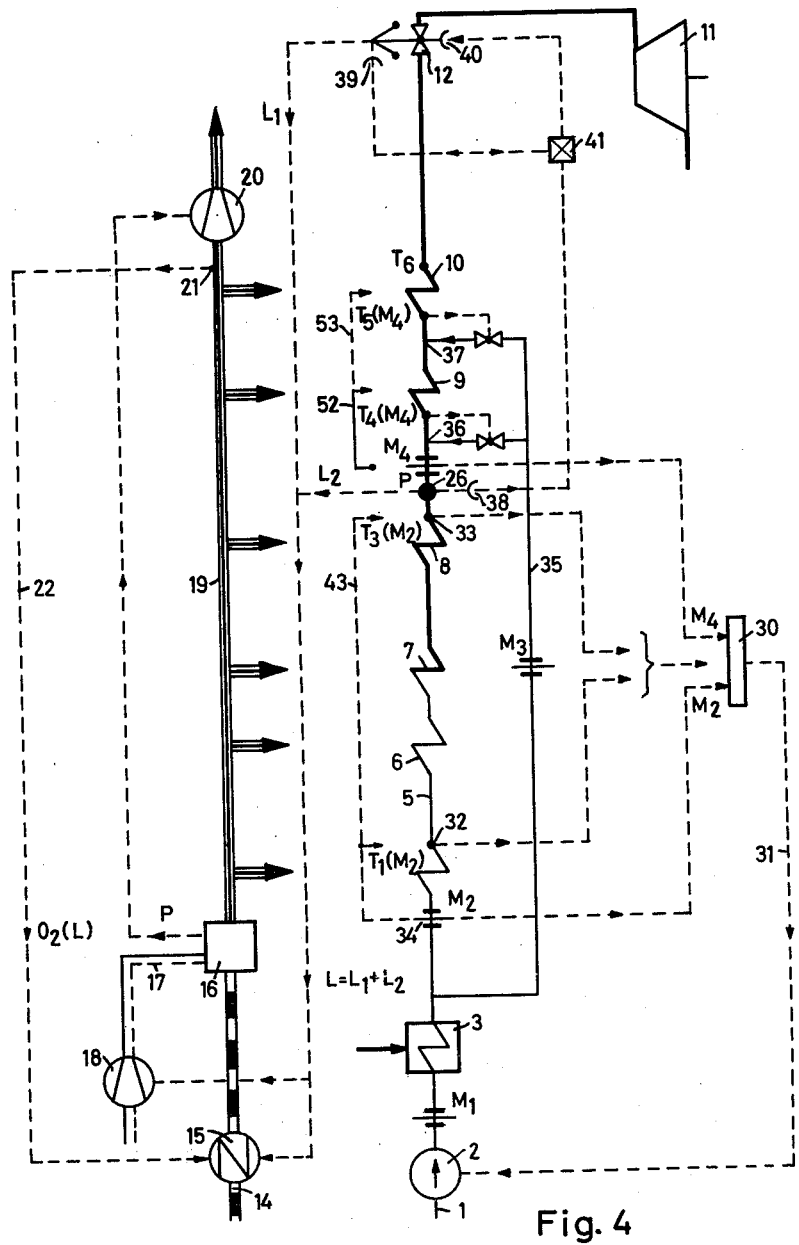
Figure 5:
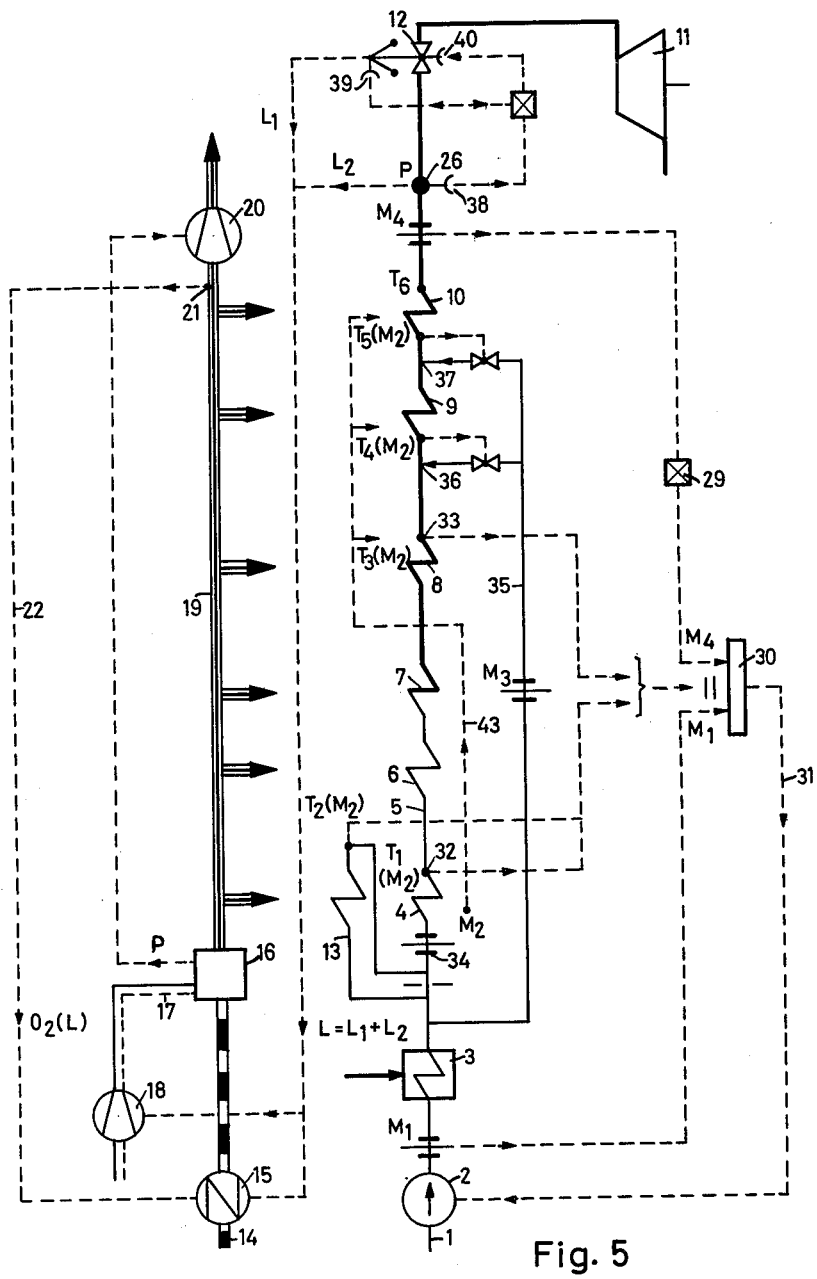
Figure 6:
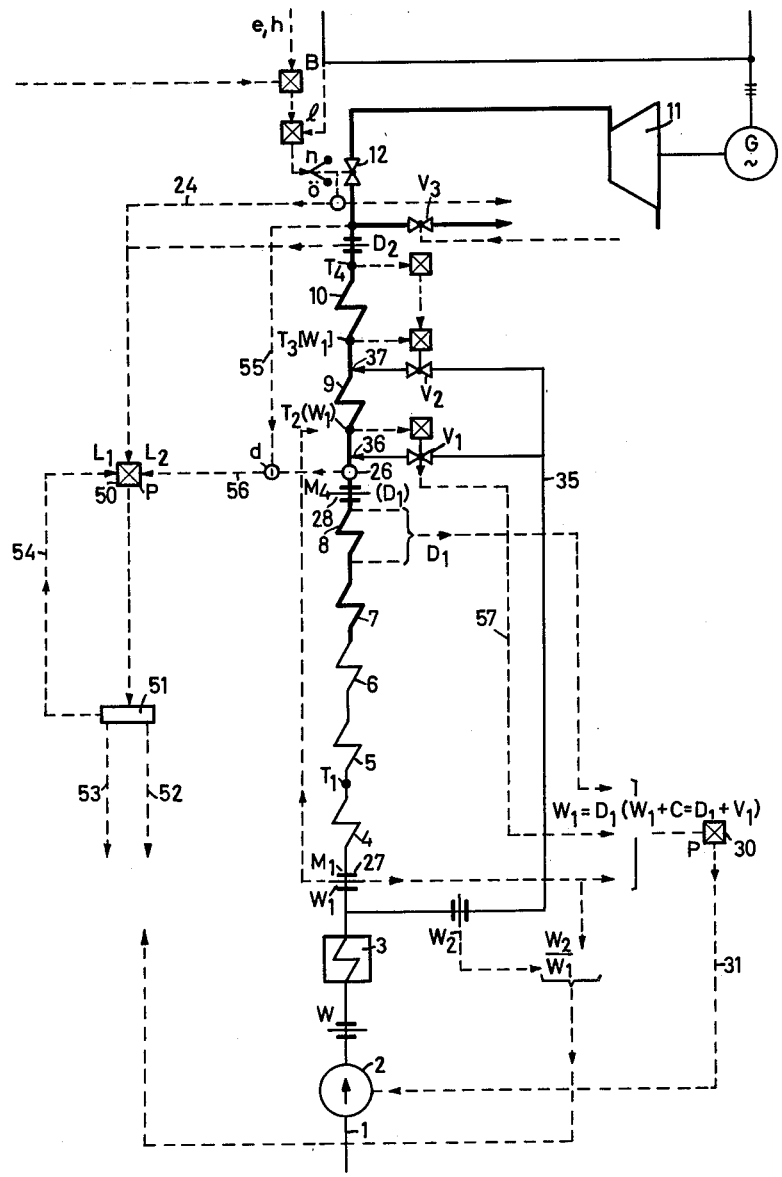
Figure 7:
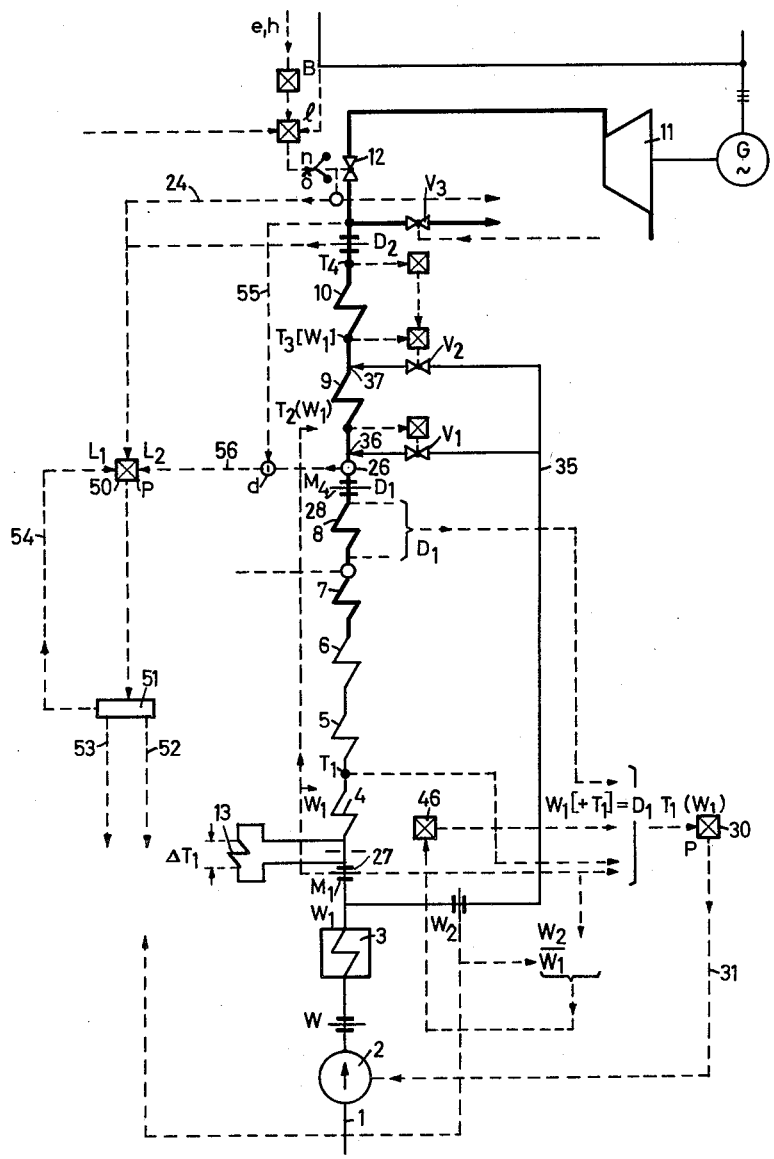

The foregoing and more specific objects and features of my invention will be apparent from, and will be mentioned in, the following description of the steam power plants according to the invention shown by way of example on the accompanying drawing in which FIGS. 1 to 7 illustrate schematically the flow- or circuit-diagrams of respective, different embodiments in a straight-line representation, FIG. 8 is a circuit diagram of a comparator applicable in the plants of FIGS. 1 to 7, and FIGS. 9 to 11 are schematic diagrams of other regulating components applicable in plants as shown in FIGS. 6 and 7.

The same reference characters are used in all illustrations to denote respectively similar components.

In FIG. 1, as well as in FIGS. 2 to 7, the flow system of the working medium is shown to the right of, and separate from, the heat-generating firing system of the steam generator. The working medium, namely feed water, enters through a supply conduit 1 into the boiler plant and passes through a controllable feed pump 2 into a high-pressure preheater 3, thence through another preheater or economizer 4 from which the water passes through a transitory portion 5 serially through an evaporator 6 and a residual evaporator 7. When leaving the evaporator 7, the entire working medium is converted into steam, this being symbolically shown by representing the next following portion of the flow system by a heavy line. The evaporated working medium passes through a superheater 8, thence through a second superheater 9 and a final superheater 10. The exit portion of the flow system is connected to a prime mover represented by a turbine 11 whose governor-controlled inlet valve is denoted by 12.

The flow system is shown provided with an "auxiliary heating surface" 13 which comprises a boiler tube heated by flue gases and extending hydraulically in parallel to a water-carrying portion of the main tube-system so as to be traversed by a branched-off quantity of water proportional to the total flow of feed water. The auxiliary heating surface 13 is shown connected to the main system on the two sides respectively of a throttle 13a. As is well known, the temperature change of the water in the auxiliary heating surface rapidly responds to changes in heating conditions and is thus available as a temperature reference for the purpose of temperature-responsive regulation.

On the fire side of the boiler the fuel enters through a supply conduit 14 into a fuel dispenser or distributor 15 and thence into the firing chamber 16 which is also supplied by combustion air 17 from a controllable compressor 18. The path of the flue gases from the firing chamber 16 to the stack is denoted by 19 and comprises at the end of the flue path an exhaust blower 20. Located at a measuring point 21 is a testing device which supervises, for example, the oxygen content of the flue gases and which controls, in dependence upon the condition being sensed either the supply of combustion air or the supply of fuel, or both. In the illustrated embodiment it is assumed, for simplicity, that the sensing device at point 21 controls the supply of fuel by dispenser 15, as is indicated by an action line 22.

In the illustrated embodiment the regulating signals for the entire plant are either initiated by the performance of the prime mover or are simultaneously applied to the prime mover. Thus the speed governor 23 of the turbine 11, schematically represented by a fly-ball regulator, issues a regulating signal or pulse $L_1$ through a signal line 24 to the regulating means on the fire side (heating system) of the plant. This turbine-load responsive signal or pulse $L_1$ passes directly to the fuel dispenser 15 and to the air supplying compressor 18 but not, as heretofore customary, to a boiler-load master device which in turn issues separate load signals for the control of fuel, air and feed water. The load pulse according to the action line 24 is supplemented by another load responsive signal or pulse $L_2$ which is added by means of an action line schematically indicated at 25. This additional load signal $L_2$ is derived from the fresh-steam pressure in dependence upon the pressure magnitude measured in the fresh-steam conduit at a measuring point 26, the magnitude of pressure P being maintained as constant as feasible.

As is apparent from the illustration, the above-mentioned load-responsive signals are issued only to the firing or heating system of the plant, whereas none of these signals or pulses is directly active upon the flow of working medium. The feed-water regulation at pump 2 is effected by the result of a comparison of the quantities of the feed water supplied with the quantities of the steam consumed, in combination with a corrective effect which is made dependent upon the respective temperature values prior to and after the evaporation of the working medium. A control signal depending upon the result of the comparison is used for controlling the feed-water pump 2 so that the supply of feed water corresponds to the steam quantity taken from the boiler exit. This will be further explained presently.

The above-mentioned quantity magnitudes are measured at locations 27 and 28 by respective quantity-responsive gauges or measuring diaphragms $M_1$ and $M_4$ hereinafter briefly referred to as measuring diaphragms. The measured values are applied to a comparator 30 as is indicated by respective connecting lines 27a and 28a. The transmission of the measuring value supplied from measuring diaphragm $M_4$ may be delayed by a time-delay member 29, but such time delay is not always necessary. An example of a comparator 30 and a suitable time-delay member will be described in detail below with reference to FIGS. 8 and 9 respectively. The magnitude resulting from the comparison in comparator 30 is applied through a control line 31 and later to feed-water pump 2 or other feed-water control means. The control signal in line 31 is subjected to corrective modification in dependence upon temperature values measured at the locations 32 and 33. The respective temperature datum values $T_1$ and $T_3$ measured at 32 and 33 depend upon the flow quantity determined at the location 34 by means of the quantity-measuring diaphragm $M_2$. Another quantity measuring diaphragm $M_3$ is disposed within an injection line 35 which supplies preheated feed water to two atomizing desuperheaters at respective injection points 36 and 37 in the superheater portion of the boiler.

The regulation of the feed-water quantity by means of the feed-water pump or a regulating valve is effected in such a manner that the quantities measured by $M_1$ and $M_4$ are substantially equal to each other during steady-state operation of the plant, a correction in dependence upon the datum temperature $T_1$ within or behind the preheater, and in dependence upon a temperature $T_3$ measured behind the starting point of the superheating, being also imposed upon the result of the comparison applied to the control of the feed-water supply. If desired, another corrective temperature signal $T_2$ can be derived from the auxiliary heating surface 13 as is schematically illustrated in FIG. 1. Like the temperatures $T_1$ and $T_3$, the auxiliary temperature value $T_2$ is simultaneously made dependent upon the quantity measured by diaphragm $M_2$. This has the result that increased flow quantities result in higher datum values of temperature.

In the embodiment shown in FIG. 1, the point 26 of substantially constant pressure P is located near the boiler exit. In such case, and in known manner, an additional pre-pressure regulator 41 may be provided as is indicated schematically by the pressure lines 38, 39, and the connection 40 between regulator 41 and regulator 23. The maintenance of substantially constant pressure at the boiler exit involves the requirement that the pressure at the boiler input must be increased with increasing load. This is because with increasing flow quantities the pressure drop from boiler entrance to boiler exit increases, so that, with increased load and the resulting higher flow quantities, a constant exit pressure can be obtained only if the pressure at the boiler entrance is increased. With varying load the fresh-steam pressure also varies in accordance with the utilized storage capacity of the boiler. Hence, after each change in load, the pressure in the boiler must again be built up or down. It would be much more favorable if the point of constant pressure P could be shifted from the boiler exit toward the interior. It is therefore preferable to place the point of constant pressure as close as feasible to the boiler entrance.

Figure 2:
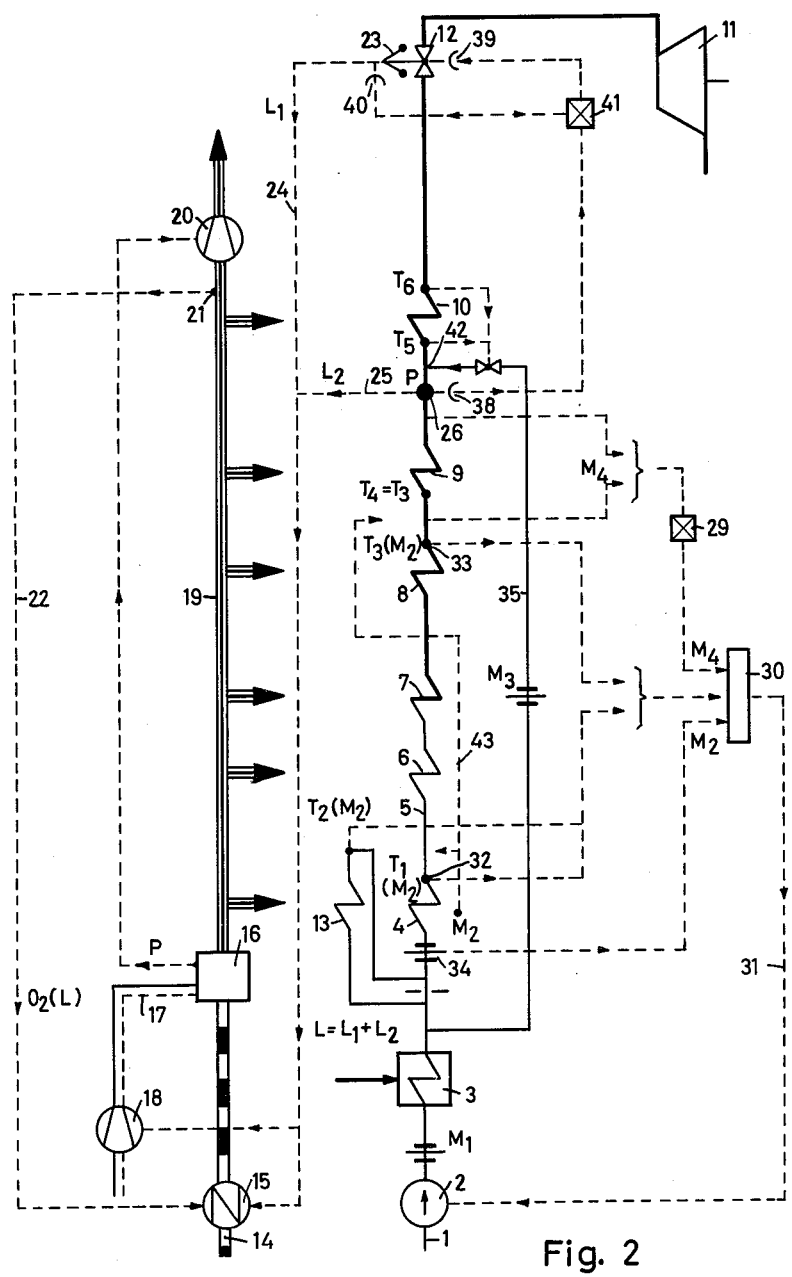

Accordingly, the embodiment illustrated in FIG. 2, while in other respects similar to that of FIG. 1, has the point 26 of constant pressure P located ahead of the boiler exit portion and within the superheater portion of the plant.

In further distinction from the embodiment of FIG. 1, the plant shown in FIG. 2 does not contain the measuring diaphragm for providing the flow quantity value $M_4$. Instead, the pressure drop in the second superheater 9 is used as a measure of the quantity $M_4$. The value $M_4$ thus is measured at a location where under steady-state conditions the pressure and the temperature are accurately or approximately constant or have definite load-dependent values. As in the plant of FIG. 1, the time-delay member 29 in FIG. 2 is optional and need not be used in many cases.

The regulation of the quantity of feed water to be supplied is effected by comparing the quantity values $M_2$ and $M_4$ and regulating the water supply toward maintaining both values substantially equal to each other, except for a correction imposed upon the regulation in dependence upon the temperature signals $T_1$, $T_3$, and if desired also in dependence upon the temperature value $T_2$, these three temperature values being simultaneously made dependent upon the flow quantity $M_2$. The flow of feed water through the injection line 35 to the injection point 42 need not be considered in this case because the injection line 35 branches from the feed-water line ahead of measuring point 34 for the quantity value $M_2$, and the injection point 42 is located behind the measuring point for quantity value $M_4$. The load dependence of the temperature values $T_1$ and $T_3$ is represented by the action line 43.

Figure 3:
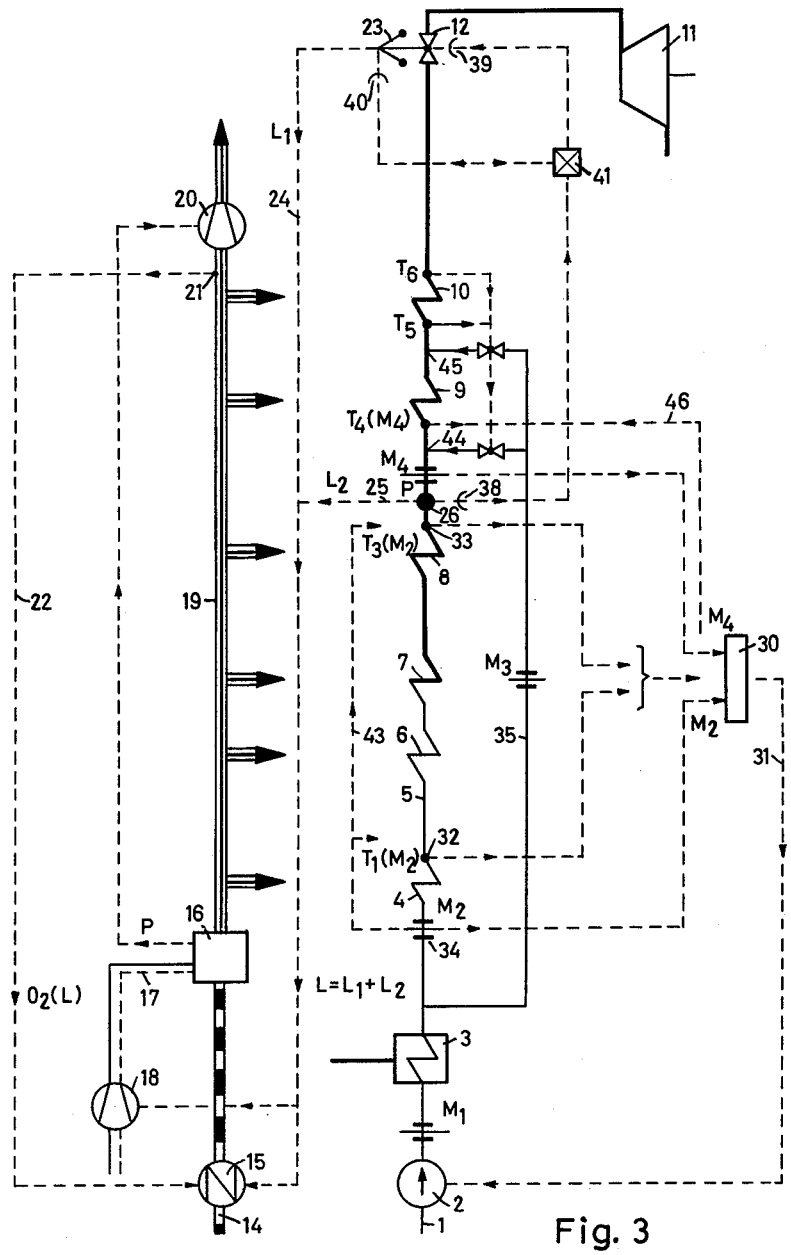

In the embodiment shown in FIG. 3, the point 26 of constant pressure P is likewise located ahead of the desuperheater injection points but is farther advanced into a boiler zone following the commencement of superheating. The location of the measuring diaphragm or gauge for furnishing the quantity value $M_4$ is substantially identical with the point 26 of constant pressure P. Two injectors are provided at points 44 and 45, and there are three measuring points for furnishing the temperature values $T_4$, $T_5$ and $T_6$. The temperature value $T_4$ is made dependent upon the measured quantity value $M_4$, this being represented by the action line 46. The second desuperheating injector at point 45 is controlled by the two temperature values $T_5$ and $T_6$ so that the temperature value $T_6$ remains substantially constant due to the fact that the datum value of $T_5$ is made dependent upon $T_6$.

According to another feature of the invention, a further improvement of the superheater regulation is obtained by providing for a correction of the datum value for the injection of water into the superheater portion of the boiler. This datum value is made dependent upon the steam quantity supplied to the superheater portion and measured ahead of the injection point.

The embodiment illustrated in FIG. 4 incorporates the just-mentioned improvement. Since in other respects the plant is similar to those described above with reference to FIGS. 1 and 3, as is apparent from the corresponding reference characters in the respective illustrations, the following description of FIG. 4 is mainly directed to the distinctive features of the plant in comparison with that shown in FIG. 3.

As explained above, the flow of working medium is regulated primarily in response to flow quantity values $M_2$ and $M_4$ supplied by respective measuring diaphragms or other quantity gauging means. The two values are compared in a comparator 30 and the resulting signal in control line 31 serves to control the feed water pump 2. The control signal, however, is subject to correction in dependence upon temperature-responsive values $T_1$, $T_3$ which correspond to the departure of the temperature at respective points 32 and 33 from respective datum values. These datum values are both dependent upon the flow quantity $M_2$ as is indicated by the action line 43. Due to this dependency, an increase in flow quantity has the effect of increasing the temperature datum values.

Another measuring diaphragm $M_3$ is located in the injection line 35 which supplies preheated water from the main flow system to two desuperheaters whose injection points are denoted by 36 and 37 respectively.

Located behind the two injection points 36 and 37, relative to the flow direction, are respectively measuring points for temperatures $T_4$ and $T_5$. According to the improvement represented in FIG. 4, the temperature regulation of the superheater portion is effected by making the temperature datum values of $T_4$ and $T_5$ dependent upon the steam quantity $M_4$ entering into the superheater and measured ahead of the injection points, this being indicated by the line 52. If desired, and as indicated by line 53, the datum value of temperature $T_5$ can also be made dependent upon the quantity value $M_4$ in an analogous manner.

Like in the embodiments shown in FIGS. 1, 2 and 3, the plant according to FIG. 4 may be optionally provided with a pre-pressure regulator operating in dependence upon the substantially constant pressure P at pressure-measuring point 26. This is schematically shown by regulator 41, pressure lines 38, 40 and connecting control line 39. The use of such auxiliary regulation, known as such, is not essential to the invention proper.

As explained, the primary load-dependent commands for controlling the regulatory performance of the steam power plants described above are applied only to the regulating devices of the firing system, whereas no such command acts directly upon the flow of working medium. This flow is regulated exclusively by the result of a comparision between the quantity of supplied feed water and the quantity of the steam consumed, subject to correction in dependence upon temperature values measured behind and ahead of the evaporation zone, with the result that the feed water supply corresponds to the steam quantity passing through the boiler outlet. It should be understood, however, that while the improvement according to the invention described above with reference to FIG. 4, as well as the improvement features described hereinafter with reference to FIGS. 5 to 7, are particularly advantageous for the just-mentioned type of boiler regulation, these features are also applicable in cases where the load-dependent control signals or pulses are simultaneously issued to the firing system and to the control means for regulating the supply of working medium, it being essential, however, that a flow quantity measurement is made of the steam through-put ahead of the superheater for effecting the above-described control and regulation of the desuperheater injections.

The embodiment illustrated in FIG. 5 is related to that of FIG. 4 in providing for flow-quantity responsive correction of the datum temperature for the control of the desuperheaters, but is otherwise similar to the above-described embodiment of FIG. 1 relative to the location of the constant-pressure point 26 and the location of the quantity gauge for furnishing the quantity value $M_4$. As apparent from FIG. 5, the point 26 for sensing the reference pressure P is located at the boiler exit, and the measuring diaphragm for gauging the value $M_4$ is located behind the final superheater 10 relative to the flow direction. As is apparent from the illustration, no provision is made for measuring the steam quantity directly ahead of the superheater, the correction of the datum value of $T_4$ and $T_5$ being effected, not in dependence upon the measuring value $M_4$ as in FIG. 4, but rather in dependence upon the measuring value $M_2$ that corresponds to the quantity of water fed into the flow system. It is not advisable to use the measuring value $M_1$ for this purpose unless the correction is to be effected in dependence upon the difference $M_1$ minus $M_3$, because the desired regulation of the temperature datum values for controlling the injection of water into the superheater portion is to be dependent only upon the quantity of steam that passes through the evaporator portion itself and enters into the superheater portion, as distinct from the branched-off amount of water passing through the injection line 35 to the injector nozzles.

The plant according to FIG. 5, like the one shown in FIGS. 1 and 2, is further provided with an auxiliary heating surface 13 from which a temperature signal $T_2$ is derived in the above-described manner, this signal being additionally employed for imposing a temperature correction upon the signal issuing from the comparator 30 through line 31 to the feed-water regulating pump 2.

As explained with reference to the preceding embodiments, the measuring value $M_2$ is placed into relation to the measuring value $M_4$ in the comparator 30, and the resulting signal is subjected to correction depending upon the temperature values $T_1$, $T_3$ and, if desired, also upon $T_2$. As is the case for the temperatures $T_1$ and $T_3$, the temperature value $T_2$ is made dependent upon the quantity measuring value $M_2$. Consequently, an increase in flow quantity has the effect of increasing the datum values of temperature.

While in the foregoing description of the plant shown in FIG. 5 reference is made to determining the quantity values by means of measuring diaphragms, it should be understood that other quantity-measuring devices are applicable and that the quantity measurement may also be effected without the use of such devices by determining the pressure drop along any of the boiler portions, for example along one of the superheaters. Thus, a pressure-measuring point may be provided behind and ahead of one of the superheater surfaces, and the pressure drop between the two points may serve as a measure and signal indicative of the flow quantity, substantially in the manner described above with reference to FIG. 2 where the quantity value $M_4$ is derived from the pressure drop of superheater 9.

In another modification of a regulating system according to the invention, a magnitude derived from the injection quantity of the desuperheater may be used, in lieu of the above-described temperature-responsive signals or in addition thereto, for regulating the supplied quantity of working medium in dependence upon the quantity of steam required at the boiler exit for the load conditions to be responded to. Such a correcting signal may be derived, for example, from the opening degree of an injection valve or the like. Another way to derive the correcting signal is from the ratio of the injection quantity versus the quantity of the working medium to be evaporated in the boiler.

As an additional correcting signal, the departure temperature in the economizer, or at a location between economizer and evaporator, from its datum value may be employed. It is further possible to use as additional correcting influence a temperature signal or pulse derived from an auxiliary heating surface in the manner explained above with reference to auxiliary heating surface 13 in FIG. 1.

Power plants embodying the above-mentioned further features of the invention will be described presently with reference to FIGS. 6 and 7.

FIG. 6 shows only the flow system from the feed water pump to the prime mover of the power plant, the firing system being assumed to be in accordance with the one described above with reference to FIG. 1 and to have corresponding control means for regulating the supply of fuel and the supply of combustion air respectively. As shown in FIG. 6, the working medium enters through conduit 1 into the boiler plant and passes through feed water pump 2 into a high-pressure preheater 3 and thence through economizer 4 for further preheating of the feed water. The water than flows through a transitory portion 5, an evaporator 6, a residual evaporator 7, a first superheater 8, a second superheater 9 and a final superheater 10. The prime mover is represented by a turbine 11 which drives an electric generator G and has an inlet valve controlled by a speed governor.

The regulating performance is primarily controlled by signals initiating from the turbine performance, or coming from a transmitter responsive to the power output and acting simultaneously upon the turbine regulator. For example, a signal $l$ responsive to power output, or a signal $e$ coming from the electrical side, or a signal $h$ supplied by manual control may be selectively supplied through a load limiter B and determines the regulation of the turbine 11 as well as the regulation of the boiler. Such a load limiter and its connection to the speed governor of the turbine will be more fully described below with reference to FIG. 11. The operation of the speed governor $n$ of the turbine, in an oil-hydraulic regulating system, has a definite relation to the control-oil pressure $o$ which thus represents a load-responsive control signal for the regulation of the boiler. This load-responsive signal, issuing from an oil-pressure gauge $o$ of the speed regulator to the regulating devices (15, 18 in FIG. 1) of the firing system is indicated in FIG. 6 by an action line 24. Connected in line 24 is a regulator 50 and a load-signal transmitter 51 which furnishes a signal to line 52 for controlling the fuel dispenser (15 in FIG. 1), and another signal to the line 53 for controlling the combustion air supplied to the firing chamber (16 in FIG. 1). Denoted in FIG. 6 by 54 is a feedback from the load-signal transmitter 51 to the regulator 50. The pressure of the working medium is measured at measuring point 26. If desired, the datum value for pressure $d$ can be varied in dependence upon measurement of the fresh-steam pressure as is indicated by the action line 55. The additional load-responsive signal passes from line 55 through line 56 to the regulator 50. The regulator 50 and transmitter 51 will be more fully described below with reference to FIG. 10.

The supply of feed water is regulated by comparing the quantity of the supplied feed water with that of the steam taken from the boiler exit, and controlling the feed water pump or feed-water control valve in dependence upon the result of the comparison so that the quantity of feed water supplied to the boiler corresponds to the quantity of steam taken from the boiler exit.

The quantity-responsive measuring values that enter into such comparison are derived, on the one hand, from a quantity-measuring diaphragm located at 27 for providing a pilot signal corresponding to the supply of feed water, and, on the other hand, from a quantity-measuring diaphragm located at 28 for supplying a pilot signal corresponding to the consumption of steam at the boiler outlet. The quantity-measuring diaphragm or other gauge at point 28, however, can be dispensed with if the pressure drop along the first superheater 8 is taken as a measure of the flow quantity in the manner described above with reference to superheater 9 in FIG. 2. The pressure difference thus measured between entrance and exit of the first superheater 8 in FIG. 6 is proportional to the throughput quantity. This value is denoted by $D_1$ (steam) whereas the corresponding water quantity determined at the point of measuring diaphragm $M_1$ is denoted by $W_1$. The regulation requires maintaining $W_1$ coincident with $D_1$. For this purpose a comparator 30 is used which places the two pilot values in relation to each other and passes through line 31 a control signal to the feedwater regulator, for example the pump 2, in accordance with the result of the comparison, substantially as described in connection with the preceding embodiments.

The regulation of the steam temperature is effected by means of an injection line 35 connected with two atomizing presuperheater valves at the injection points 36 and 37 respectively. The quantity of the injection water passing through line 35 is measured by means of a measuring diaphragm which furnishes the quantity value $W_2$. Connected in the line ahead of the two injection points 36 and 37 are respective valves $V_1$ and $V_2$ which may consist of the injection valves themselves and are controlled by temperature-responsive signals. Now, according to the improvement feature here of interest, the performance condition of such a valve, for example the degree of valve opening of valve $V_1$ is utilized as a corrective signal acting upon the comparator 30, this being represented by the action line 57.

In the embodiment illustrated in FIG. 7 a correcting signal is derived not from the opening condition of a valve in the injection line but rather from the ratio of the quantity of injection water to the quantity of working medium to be evaporated. The two values $W_1$ and $W_2$ correspond to the quantity of water supplied to the boiler and the quantity of water flowing through the injection line 35 respectively. A computer device 46 forms a ratio of the two measuring values $W_1$ and $W_2$ and applies the result as a correcting magnitude to a comparator 30. As a result, comparator 30 operates to establish the equation $W_1 = D_1$, corrected by $W_2/W_1$. The device 46 may be designed as a correcting regulator and, as regards design and operation, may be similar in principle to the comparator 30, more fully described below with reference to FIG. 8.

The temperature of the working medium can be measured in the economizer 4 or at another suitable location in order to form a temperature signal magnitude $T_1$. A departure of this measured temperature value $T_1$ from its desired datum value $T'_1$ can be used as an error magnitude for further correction of the regulating operation, as is also schematically indicated in FIG. 7. As a result, the regulation of the feed-water supply is then effected in accordance with the following condition of equilibrium:

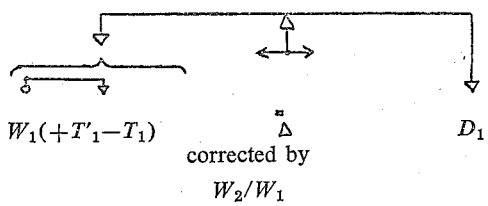

$$W_1(+T'_1-T_1) \quad \overset{=}{\Delta} \quad D_1$$
corrected by
$$W_2/W_1$$

When providing the plant with an auxiliary heating surface 13 as also shown in FIG. 7, the temperature difference $\Delta T_1$ of the auxiliary heating surface 13 can be utilized as an error signal for correction of the regulating performance instead of the above-mentioned departure of the measured temperature value $T_1$ from its datum value.

The comparator 30 shown in FIG. 1, as well as in FIGS. 2 to 7, may operate mechanically, hydraulically or electrically. A comparator of electrical type has been chosen for illustration in FIG. 8 merely because such an electrical device lends itself more readily to being illustrated in a single illustration. In the following, the comparator of FIG. 8 will be described in conjunction with FIG. 1, although similar devices are also applicable in conjunction with any of the other embodiments of power plants according to the invention. It will be understood that the various flow quantity and temperature gauges, for use with an electric comparator, are connected with, or designed as, a transducer that translates the measured flow quantity or temperature into an electric voltage.

According to FIG. 8 the comparator 30 has two resistors 27b and 28b connected to the respective signal lines 27a ($M_1$) and 28a ($M_4$). The output circuit 31 of the comparator comprises the two resistors 27b and 28b in series so that the voltage $E_1$ across both resistors is equal to the difference of the two pilot voltages that correspond to $M_1$ and $M_4$. That is, these two voltages are connected in opposition to each other as is indicated in FIG. 8 by arrows A and B. Consequently, when the values $M_1$ and $M_4$ are equal, the voltage $E_1$ is zero.

The temperature-responsive magnitude $T_1$, supplied through line 32b, produces a corresponding voltage across the tapped-off portion of a resistor 32d. The temperature-responsive magnitude $T_3$ produces a proportional voltage across another resistor 131. Both voltages are subject to modification in dependence upon variation of the flow-quantity magnitude $M_2$. The resistor 32d and 131 are connected in series across a resistor 33c which has a tapped-off portion serially connected in the control circuit 31. When the temperature values $T_1$ and $T_3$ differ from each other, they impress a voltage $E_3$ across the resistor 33c. The output voltage $E_2$ in control circuit 31 depends upon the two voltages $E_1$ and $E_3$, the voltage $E_3$ being taken from across the tapped portion of resistor 33c which is adjustable in accordance with the particular characteristics or construction of the boiler plant.

The polarity of the resultant control voltage $E_2$ is determined by the polarity of the preponderant voltage $E_1$ or $E_3$. The magnitude of control voltage $E_2$ is determined by the sum of the voltages $E_1$ and $E_3$. The voltage $E_3$ is small relative to that of $E_2$. Consequently, the control voltage $E_2$ is approximately equal to the difference between $M_1$ and $M_4$ but is somewhat modified by the voltage $E_3$ corrected by the resistor 33c.

The above-described circuit connections correspond to the equation $$M_4-M_1+C(T_3 f(M_2)-KT_1 f(M_2))=0$$

or:

$$M_4-M_1+C.f(M_2).(T_3-k.T_1)=0$$

wherein $C$ and $k$ are normally constant factors.

The comparator operates as follows:

Assume that the power plant according to FIG. 1 has been operating under steady-state conditions. Then the respective voltages impressed upon resistors 27c and 28c (FIG. 8) in accordance with the measured quantity values $M_1$ and $M_4$, subject to correction by the voltage from resistor 33c, balance each other so that the signal voltage $E_2$ in control circuit 31 is substantially zero and no regulating action is imposed upon the feed-water pump.

Now assume that a load surge occurs and that more than the normal amount of steam is taken from the boiler exit. This event is first signaled at measuring point 28 (FIG. 1) by an increase in the steam quantity value $M_4$. Consequently, now the voltage across resistor 28b (FIG. 8) becomes greater than the $M_1$ voltage across resistor 27b, and the differential control voltage $E_2$ in control circuit 31 assumes a finite, positive value whose polarity corresponds to that indicated by the arrow B. As a result, a positive regulating signal passes through circuit 31 to the feed-water pump 2 and causes it to increase the delivery of feed water with the effect of raising the feed-water quantity value $M_2$ according to FIG. 2, or $M_1$ according to FIG. 1. This increases the voltage impressed upon the resistor 27b until a new balance with the $M_4$ voltage of resistor 28b is established. Then the output voltage $E_2$ in control circuit 31 is again reduced to zero and the system may continue operating under steady-state conditions till no further change in steam output takes place.

It is necessary, however, to impose one or more corrections upon the just-mentioned regulating performance. These corrections are needed because of the time delay occurring from the response of the steam-pressure gauge at point 28 furnishing the value $M_4$ and the subsequent response of the feed-water pump measured by the increase in the quantity $M_1$ at point 27. This time interval may be too long, making the resulting regulatory response too sluggish for satisfactory regulation. The just-mentioned corrections serve to minimize such delays in dependence upon the temperature $T_3$ measured at point 33 and, if desired, also in dependence upon the temperatures $T_1$ and $T_2$ as will be explained presently.

Referring again to the above-mentioned increase in steam consumption beyond the steady-state condition previously existing, the steam temperature $T_3$ at point 33 will at first drop below its correct datum value so that the temperature gauge or transducer imposes through circuit 33a a voltage $E_3$ across the resistor 33c in cumulative relation to the control voltage $E_2$ (arrow B). This voltage $E_3$ is small compared with the voltage $E_1$ but increases the control voltage $E_2$ sufficiently to speed up, or somewhat over-regulate, the feed-water pump 2, thus passing initially a slightly greater amount of feed water into the boiler than is called for by the new steady-state condition to be established. Thereafter, but still within the transitory period, the feed-water temperature $T_1$ measured at point 32, and as the case may be also the water temperature $T_2$ at the heating surface 13, will drop because of the increased flow of feed water. The corresponding error voltages supplied by the temperature gauges or transducers to the circuit 32b have the result of imposing a corrective voltage upon the resistor 32d. This voltage is small in comparison with the resultant control voltage $E_2$, but imposes a subtractive effect (in the direction of arrow A) upon the control voltage $E_2$ and thus counteracts the correcting effect of the voltage across the resistor 33c. As a result, the over-regulation of the feed-water pump 2 is gradually eliminated and overshooting of the regulatory effect is avoided.

An example of a temperature gauge for measuring the temperature $T_3$ is also shown in FIG. 8, it being understood that the other temperature gauges for issuing a signal corresponding to $T_1$, $T_2$ in FIG. 1, or corresponding to $T_3$, $T_5$, $T_6$ in the other embodiments (FIGS. 2 to 7) may be similar in design and operation.

According to FIG. 8, the circuit 33a receives voltage $E_3$ from across two series connected resistors 131, 32d. Resistor 131 receives voltage from a temperature gauge 133 which is located at point 33 (FIG. 1) and is shown in FIG. 8 as a thermocouple. The resistor 32d receives adjustable voltage from a thermocouple in the same manner. When the measured temperature is equal to the datum value, the two voltages across resistors 131 and 32d balance each other so that the error voltage $E_3$ is zero. However, when the voltage measured by gauge 133 departs upwardly or downwardly from the datum value, the error voltage $E_3$ assumes a finite, positive or negative value depending upon the direction of temperature departure.

It will be understood that amplifiers, switches or other conventional auxiliaries may be added wherever needed or desirable.

The above-mentioned time-delay member 29, optionally applicable in the described boiler regulating systems and shown in FIGS. 1, 2 and 5, may have any suitable design, for instance that of a motor-driven follow-up regulator as schematically illustrated in FIG. 9 and described presently.

The device according to FIG. 9 is provided with an annular glass tube 101 filled up to one-half with mercury and rotatable about its center. The tubular device 101 is mechanically coupled with the flow-quantity gauge so as to be rotated in proportion to changes in measured flow quantity. The annular tube encloses a resistance wire. The mercury pool is connected with an electric terminal, and the resistance wire has one end connected with the other terminal. The mercury short-circuits a portion of the resistance wire so that the effective resistance of the wire depends upon the angular position of the tube. The resistance value thus effective between the two terminals may have a linear relation to the changes in flow quantity that cause rotation of the tubular member. However, any other dependency between resistance value and measured quantity can be obtained by providing correspondingly shaped cam discs in the mechanical coupling that connects the tubular member with the quantity measuring gauge. It will be understood that the tubular device is essentially a variable resistor. This resistor forms the input stage of the time-delaying follow-up regulator 29. As a result of the above-mentioned rotation, dependent upon the measured quantity value ($M_4$ at 28 in FIG. 1), the voltage impressed upon the diagonal 107 of a Wheatstone bridge network connected to member 101 varies in proportion to the rotation of the annular member 101. This diagonal voltage is applied through an amplifier 102 to a motor 103. The motor 103, operating through a worm gear transmission 104, rotates two annular tube members 105 and 106 coaxially mounted on a common shaft. The two members 105 and 106 operate as adjustable resistors in the same manner as the above-described member 101. The voltage in the diagonal 107 of the bridge network becomes zero when the resistance value of member 105 is equal to that of member 101. The period of time required for such follow-up operation is determined by the revolving speed of the motor 103 which depends upon the magnitude of the voltage of the bridge diagonal 107. The output signal for the comparator 30 (FIGS. 1 and 10) issues from the annular resistor member 106 to the line 28a as is apparent from FIG. 9. The motor 103 is energized from an alternating-current line through a transformer 108.

An example of a regulator 50, a load-signal transmitter 51 and a feedback connection 54 as described above with reference to FIGS. 6 and 7 where these components are shown schematically only, is separately illustrated in FIG. 10. The load regulator 50 comprises a bridge network 151 and receives an input signal from the oil-pressure gauge o which varies the setting of a bridge resistor 152 in accordance with variations in oil pressure. The variation of resistance 152 causes a voltage to appear in the diagonal 153 of the network 151. This voltage is amplified by an amplifier 154 and applied to the drive motor M of the load-signal transmitter 51. The motor turns the shaft 155 of the transmitter which actuates three rheostats 156, 157 and 158. Rheostat 156 controls the line 53 for regulating the supply of combustion air to the boiler. Rheostat 157, acting through line 52, regulates the fuel supply to the boiler, and rheostat 158 acts through the feedback connection 54 upon a balancing resistor 159 of the bridge network 151 in regulator 50, as described above with reference to FIG. 6.

The operation of the regulator 50 is corrected by means of an auxiliary load-signal transmitter in dependence upon the boiler steam pressure d measured at point 26 (FIGS. 6, 10). This pressure controls the setting of a rheostat $d_1$ in a bridge network 160. The network 160 also comprises a rheostat $d_2$ which permits setting a desired datum value of pressure, this being done either by hand or automatically through a regulator 55a in response to a regulating signal supplied through line 55 as described above with reference to FIG. 6. Any departure of the measured pressure from the datum pressure set at rheostat $d_2$ causes a voltage to appear in the diagonal of the bridge network, and a portion of this voltage, tapped off from a resistor 161, is supplied through the line 56 to the amplifier 154 in order to impose the desired correction upon the amplifier output voltage supplied to the drive motor M of the load-signal transmitter 51.

The purpose of the load limiter, shown at B in FIGS. 6 and 7 and separately illustrated in FIG. 11, is to limit the maximum power output of the prime mover and also the minimum output. The signals indicating a change in power are supplied through a load distributor or line L either manually (signal h) or electrically (signel e). The signal has the effect of changing the setting of an adjustable resistor 171. Another resistor 172 serves to limit the power of the turbine 11 to a desired maximum and is adjustable by displacement of its tap contact. The turbine can operate for a power output up to 100% of the datum value. When this adjusted maximum load is exceeded, the voltage tapped off from resistor 172 actuates an electromagnetic relay $R_2$ which opens a switch $S_2$ and thus prevents further increase in power. In a similar manner, a minimum limiting resistor 173 acts through a relay $R_3$ to open a switch $S_3$ when the power output decreases below a predetermined minimum value, thus preventing a further decline in turbine load. The switches $S_2$ and $S_3$ are connected with the controls of the speed governor acting upon the steam inlet valve 12. Whenever one of the switches $S_2$ or $S_3$ opens, the speed setting of the turbine governor remains constant at the adjusted value.

It will be obvious to those skilled in the art, upon studying this disclosure, that steam power plants according to my invention permit of a great variety of modifications and hence can be given embodiments other than those particularly illustrated and described herein, without departing from the essential features of my invention and within the scope of the claims annexed hereto.

I claim:

1. A steam power plant having a forced-flow steam generator provided with a firing system and a flow system for working medium as feed water to be evaporated to steam and superheated, said generator having an individual water-containing heating surface portion and an individual superheated steam-containing heating surface portion, said flow system having feed water supply means as its entrance and means for being connected at its exit to a steam consumer, said generator being provided with a feed regulator and a heat regulator for separate regulation of said feed water supply means and of said firing system, regulating apparatus for said steam power plant comprising a comparator for providing to said feed regulator a control signal responsive to a comparative measurement of fluid flow quantity data at given locations in said respective individual water-containing and steam-containing heating-surface portions in dependence upon the quantity of working medium flowing through said water-containing heating-surface portion, means for applying a correction to said comparator comprising two temperature-responsive signal sources located respectively at other predetermined locations in said individual heating-surface portions, flow-quantity-responsive gauge means for adjusting temperature datum values in dependence upon the instantaneous flow quantity determined at a location in said water-containing portion, said signal source and said gauge means being jointly connected to said comparator for issuing to said comparator respective signals indicative of the departure of the temperature at said other respective locations from said datum values adjusted by said gauge means, said comparator having output means controllingly connected to said feed regulator for controlling said feed regulator in dependence upon the comparative resultant of said two signals so as to bring the supply of feed water to be evaporated into correspondence with and equal to the quantity of said working medium flowing through said water-containing portion and thus into correspondence with the steam quantities required by the particular load conditions prevailing.

2. In a steam power plant according to claim 1, said water-containing heating-surface portion comprising an evaporator, said two temperature-responsive signal sources being disposed in said flow system at points preceding and following evaporator respectively.

3. In a steam power plant according to claim 1, and wherein said flow system includes desuperheater injector means for regulating the steam temperature of said superheater heating surface portion, said injector means having a water supply conduit and injection control means for varying the quantity of water being injected, temperature sensing means connected with said control means for varying said injected water quantity in dependence upon departure of the steam temperature from a datum value for steam temperature, said sensing means including datum control means for setting said datum value for steam temperature in response to the instantaneous steam quantity passing through said superheater heating surface portion at a point ahead of said injector means, whereby the datum values for the steam-temperature regulation of the superheater surface portion are additionally controlled by the quantity of working medium flowing through the evaporator portion of the boiler.

4. A steam power plant having a forced-flow steam generator provided with a firing system and a flow system for working medium as feed water to be evaporated to steam and superheated, said generator having an individual water-containing heating surface portion and an individual superheater steam-containing heating surface portion, said flow system having feed water supply means at its entrance and means for being connected at its exit to a steam consumer, said generator being provided with a feed regulator and a heat regulator for separate regulation of said feed water supply means and of said firing system, regulating apparatus for said steam power plant comprising a comparator for providing to said feed regulator a control signal responsive to a comparative measurement of fluid flow quantity data at given locations in said respective individual water-containing and steam-containing heating-surface portions in dependence upon the quantity of working medium flowing through said water-containing heating-surface portion, means for applying a correction to said comparator comprising two temperature-responsive signal sources located respectively at other predetermined locations in said individual heating-surface portions, flow-quantity-responsive gauge means for adjusting temperature datum values in dependence upon the instantaneous flow quantity determined at a location in said water-containing portion, said signal sources and said gauge means being jointly connected to said comparator for issuing to said comparator respective signals indicative of the departure of the temperature at said other respective locations from said datum values adjusted by said gauge means, said comparator having output means controllingly connected to said feed regulator for controlling said feed regulator in dependence upon the comparative resultant of said two signals so as to bring the supply of feed water to be evaporated into correspondence with and equal to the quantity of said working medium flowing through said water-containing portion and thus into correspondence with the steam quantities required by the particular load conditions prevailing, desuperheater injector means for regulating the steam temperature of said steam-containing portion, said injector means being connected with said feed water supply means and having injection control means for varying the quantity of water passing from said supply means through said injector means, temperature responsive gauge means connected with said injection control means for varying said injection quantity in dependence upon the steam temperature, flow-quantity gauge means responsive to said injection quantity and connected to said comparator for imposing upon the regulation of the feed water supply a correction depending upon said injection quantity.

5. A steam power plant having a forced-flow steam generator provided with a firing system and a flow system for working medium as feed water to be evaporated to steam and superheated, said generator having an individual water-containing heating surface portion and an individual superheater steam-containing heating surface portion, said flow system having feed water supply means at its entrance and means for being connected at its exit to a steam consumer, said generator being provided with a feed regulator and a heat regulator for separate regulation of said feed water supply means and of said firing system, regulating apparatus for said steam power plant comprising a comparator for providing to said feed regulator a control signal responsive to a comparative measurement of fluid flow quantity data at given locations in said respective individual water-containing and steam-containing heating-surface portions in dependence upon the quantity of working medium flowing through said water-containing heating-surface portion, means for applying a correction to said comparator comprising two temperature-responsive signal sources located respectively at other predetermined locations in said individual heating-surface portions, flow-quantity-responsive gauge means for adjusting temperature datum values in dependence upon the instantaneous flow quantity determined at a location in said water-containing portion, said signal sources and said gauge means being jointly connected to said comparator for issuing to said comparator respective signals indicative of the departure of the temperature at said other respective locations from said datum values adjusted by said gauge means, said comparator having output means controllingly connected to said feed regulator for controlling said feed regulator in dependence upon the comparative resultant of said two signals so as to bring the supply of feed water to be evaporated into correspondence with and equal to the qauntity of said working medium flowing through said water-containing portion and thus into correspondence with the steam quantities required by the particular load conditions prevailing, said flow system including a superheater, desuperheater injector means for regulating the steam temperature of said superheater, said injector means being connected with said feed water supply means and having injection valve means for varying the quantity of water passing from said supply means through said injector means, temperature responsive gauge means connected with said valve means for varying said injection quantity in dependence upon the steam temperature, and transmission means connecting said valve means to said comparator for supplying it with a signal indicative of the opening degree of said valve means to impose upon said feed water regulation a correction depending upon said injection quantity.

6. A regulating apparatus according to claim 1, and wherein said flow system includes desuperheater injector means for regulating the steam temperature of said superheater heating surface portions, said injector means being connected with said feed water supply means and having injection control means for varying the quantity of water passing from said supply means through said injector means, temperature responsive gauge means connected with said injection control means for varying said injection quantity in dependence upon the steam temperature, correcting means responsive to the quantity of water to be evaporated in said flow system and to said injection quantity, said correcting means being connected with said comparator for imposing upon the regulation of the feed water supply a correction depending upon the ratio of said latter two quantities.

References Cited in the file of this patent
UNITED STATES PATENTS

| | | |
|---|---|---|
| 1,975,086 | Dickey | Oct. 2, 1934 |
| 1,975,104 | Junkins | Oct. 2, 1934 |
| 2,081,948 | Michel | June 1, 1937 |
| 2,088,623 | Thompson | Aug. 3, 1937 |
| 2,106,346 | Gleichmann | Jan. 25, 1938 |
| 2,170,348 | Dickey | Aug. 22, 1939 |
| 2,170,350 | Hardgrove | Aug. 22, 1939 |
| 2,356,533 | Riedel | Aug. 22, 1944 |
| 2,526,843 | Birchler et al. | Oct. 24, 1950 |
| 2,643,520 | Powell | June 30, 1953 |

OTHER REFERENCES

"Combustion" of August 1956, pages 47 to 56, published by Combustion Publishing Co. (New York).